United States Patent [19]
Dymond

[11] Patent Number: 4,631,137
[45] Date of Patent: Dec. 23, 1986

[54] MATERIALS FOR USE IN DRILLING FLUIDS

[75] Inventor: Brian Dymond, Bradford, England

[73] Assignee: Allied Colloids Ltd., England

[21] Appl. No.: 666,412

[22] Filed: Oct. 30, 1984

[30] Foreign Application Priority Data

Nov. 2, 1983 [GB] United Kingdom ................. 8329249

[51] Int. Cl.$^4$ ............................................... C09K 7/02
[52] U.S. Cl. .................................... 252/8.514; 252/8.51
[58] Field of Search .......................... 252/8.5 A, 8.5 C

[56] References Cited

U.S. PATENT DOCUMENTS

| | | | |
|---|---|---|---|
| 2,702,788 | 2/1955 | Dawson | 252/8.5 |
| 2,718,497 | 9/1955 | Oldham et al. | 252/8.5 |
| 3,081,260 | 3/1963 | Park | 252/8.5 |
| 3,220,946 | 11/1965 | Turner | 252/8.5 |
| 3,558,545 | 1/1971 | Lummus | 252/8.5 |
| 4,118,441 | 10/1978 | LeBlanc | 252/8.5 X |
| 4,128,528 | 12/1978 | Frisque | 252/8.5 X |

*Primary Examiner*—Herbert B. Guynn
*Attorney, Agent, or Firm*—Lawrence Rosen

[57] ABSTRACT

Bentonites can be extended for use in drilling muds by addition of a novel polymer blend comprising a low molecular weight water soluble non-ionic or anionic polymer and a high molecular weight anionic polymer.

12 Claims, No Drawings

MATERIALS FOR USE IN DRILLING FLUIDS

Bentonites are widely used in drilling muds to increase viscosity, improve cuttings carrying properties, reduce filtrate loss to the formation and impart other desirable characteristics to drilling muds.

In A.P.I. Spec.13A, the American Petroleum Institute (A.P.I.) has defined the preferred performance properties of bentonites in drilling muds. The A.P.I. specification states that for a 22.5 pound per barrel (p.p.b.) suspension of bentonite in water, the following criteria should be satisified:
1. The suspension should have an apparent viscosity (A.V.) greater than 15 cps.
2. The yield point (Y.P.) expressed in lbs per 100 ft$^2$ should not exceed three times the plastic viscosity (PV) expressed in cps.
3. The low pressure A.P.I. 30 minute fluid loss should not exceed 15 cm$^3$.

Wyoming bentonite is the optimum bentonite for use in drilling muds and generally meets this specification but as the deposits of the high grade Wyoming bentonite become depleted, lower grade bentonites are being used increasingly for drilling mud applications. Unfortunately, some lower grade bentonites do not always swell sufficiently on hydration and so not all the requirements of the A.P.I. specification above are met.

It is known to include additives in drilling muds to improve their properties. For instance in U.S. Pat. No. 3,764,530, thermal degradation is reduced by incorporating a very low molecular weight polyacrylate. In particular it is known to include certain materials in drilling muds containing low grade bentonites with the intention that the muds meet all the criteria of, or come much closer to, the A.P.I. specification. This is known in the art as extending the bentonite. Addition of the extenders generally increases the A.V. and the YP:PV ratio and the low pressure fluid loss generally increases.

The most common extenders used in the industry are carboxymethyl cellulose, high molecular weight polyacrylamide and various copolymers of acrylamide and acrylic acid, often with sodium carbonate.

The use of sodium polyacrylate with molecular weight 25,000 to 150,000 for extension of sodium bentonite clays is described in U.S. Pat. No. 3,220,946. Addition of sodium polyacrylate to drilling mud clays is described in U.S. Pat. No. 2,702,788. A combination of very high molecular weight polyacrylate and acrylate-acrylamide copolymers is used to extend bentonite in U.S. Pat. No. 3,558,545.

It is not uncommon for some lower grade bentonites, even after extension with conventional extenders, to fail to meet the requirements of the A.P.I. specification. More specifically, the required dose of conventional extender necessary to increase the A.V. above the minimum requirement of 15 cps can result in a YP:PV ratio greater than 3, and this is undesirable in drilling muds.

The invention relates to the surprising discovery that it is useful to formulate a blend of certain low and high molecular materials and that this blend is a very effective extender for bentonites.

A composition according to the invention comprises a blend of a low molecular weight, water soluble, non-ionic or anionic polymer having a molecular weight below about 50,000 and a high molecular weight, water soluble polymer having a molecular weight above about 500,000 and formed from polymerisable monomers of which at least 30% by weight are acidic monomers.

These novel blends are of particular value as extenders for bentonite type clays and so the compositions of the invention will preferably also contain a bentonite type clay. These blends can be made merely by mixing the clay with the polymers by techniques conventional for forming extended bentonites.

The extended bentonites are of particular value in drilling muds and so the compositions will generally contain components conventional in drilling muds and, in particular, preferred compositions according to the invention are drilling muds containing the bentonite type clay and the extending blend.

The molecular weight of the low molecular weight component must not be too high as otherwise this will detract from the properties of the blend. It is usually below about 20,000 although satisfactory results can be obtained with higher molecular weights. For instance, polyacrylic acid homopolymer and other acrylic acid polymers having molecular weights up to around 30,000 or around 40,000 can give very satisfactory results. Good results can be obtained with methacrylic acid homopolymer and with other polymers at molecular weights of, for instance, around 15,000 but it is generally preferred that the molecular weight should be below about 10,000, most preferably below 5,000 but above 1,000, most preferably in the range about 2,000 to about 5,000.

The low molecular weight polymer can be wholly non-ionic or it can be anionic, in which event it can be formed wholly of anionic components or it can be formed from anionic and non-ionic components. It can be a naturally occurring polymer or a derivative thereof or it can be a synthetically produced polymer. Suitable natural or modified natural polymers include starch and starch derivatives, carboxymethyl cellulose and other cellulose derivatives, polyphosphonates and lignosulphonates. Suitable non-ionic synthetic polymers include polyvinyl pyrrolidone, polyvinyl alcohol, and homopolymers and copolymers of non-ionic groups such as N-vinyl-N-methyl acetamide, acrylamide, methacrylamide, acrylonitrile and methyl or other low alkyl (generally $C_{1-4}$)acrylate and vinyl acetate.

Synthetic anionic polymers may be formed from polymerisable carboxylic and sulphonic monomers, often ethylenically unsaturated, and typically selected from acrylic acid, methacrylic acid, maleic acid, itaconic acid, allyl sulphonic acid and 2-acrylamido-2-methyl propane sulphonic acid (AMPS). The acid groups may be present as free acid groups, especially when the polymer is synthesised initially, but generally in use the acid groups are present as water soluble ammonium or alkali metal (generally sodium) salts. Copolymers of two or more acidic monomers may be used.

The best results are generally obtained with anionic contents of at least 70% by weight and the preferred polymers for use in the invention are polymers formed of 70 to 100% by weight acrylic acid (or other ethylenically unsaturated acidic monomer) and 0 to 30% by weight acrylamide (or other ethylenically unsaturated non-ionic monomer), most preferably polyacrylic acid homopolymer. However satisfactory results can also be obtained with much lower anionic contents, for instance down to about 40% and often down to about 20%, and even down to about 5% by weight of the polymerisable monomers.

The high molecular weight polymer generally has a molecular weight of at least about 1 million and it can be as high as 15 million or 20 million or more, but preferably the molecular weight is in the range of about 1 million to about 10 million.

If the anionic content of the high molecular weight polymer is too low, the blend will have inferior properties and it is generally preferred that at least 40% and most preferably at least 60% by weight of the polymerisable monomers should be acidic monomers. Best results are generally obtained with at least 70%, and most preferably 100%, of the monomers being acidic monomers. Suitable ethylenically unsaturated and other polymerisable monomers may be selected from the carboxylic and sulphonic monomers listed above. Any comonomers in the high molecular weight polymer are generally selected from the non-ionic monomers listed above, preferably acrylamide. For instance, the high molecular weight polymer may be formed by hydrolysing polyacrylamide.

The preferred polymer blends of the invention are those in which each polymer is formed from 70% to 100% acrylic acid and 0 to 30% acrylamide, most preferably 100% acrylic acid, the acid groups generally being present as the sodium salt.

The blend is generally substantially free of acidic or other polymer having a molecular weight outside the defined high and low molecular weight ranges. The blend may be a bimodal polymeric product, but generally is made by blending a suitable low molecular weight polymer with a suitable high molecular weight polymer.

The weight ratio low molecular weight polymer:high molecular weight polymer is generally in the range 10:1 to 1:5. Generally the weight of low molecular weight polymer is greater than the weight of high molecular weight polymer, typical ratios therefore being 5:1 to 1:1, most preferably about 2:1.

The bentonite-type clay will normally be a bentonite-type clay whose properties in drilling muds require improvement and preferably the extension results in improvement in one or more of the properties defined in the A.P.I. specification and preferably results in improvement in each and every property that is outside the A.P.I. specification. Preferred compositions of the invention are those in which the components of the blend and the amount of blend are such that a bentonite that is outside the A.P.I. specification is extended by the blend to such an extent that it meets the A.P.I. specification. The blends of our invention are therefore most useful with the lower yielding bentonites which just fail to meet the above A.P.I. specification with conventional additives.

The bentonite-type clay is generally selected from montmorillonite, hectorite, saponite, nontronite and other similar hydratable, expanding lattice clays. Blends of bentonites which contain some naturally high yielding bentonite can be used.

The polymer blend is incorporated with the bentonite in an appropriate amount that is generally in the range 0.005 to 1%, preferably 0.01 to 1% by weight dry polymer based on dry bentonite. If inadequate extension is obtained with any particular amount, a larger amount should be used.

It is very surprising that the defined blends are capable of giving useful extension and the mechanism by which they achieve their effect is at present unknown. The high molecular weight polymers can be considered to be flocculants but the contribution of the low molecular weight polymers is unclear, particularly since although the anionic low molecular weight polymers could be regarded as dispersants, many of the other low molecular weight polymers would not be regarded as dispersants.

EXAMPLES

In order to determine the extension properties of various polymers and polymer blends a series of tests were conducted in each of which 22.5 ppb of a bentonite or extended bentonite were prepared and tested according to the procedures in API Specification 13A.

The following polymers were tested:

Low Molecular Weight Polymers

A—Methacrylic acid homopolymer mw about 15,000
B—2-acrylamido-2-methyl propane sulphonic acid homopolymer
C—80:20 acrylic acid:acrylamide copolymer
D—40:60 acrylic acid:acrylamide copolymer
E—20:80 methyl acrylate:acrylic acid copolymer
F—13:87 allyl sulphonic acid:acrylic acid copolymer
G—50:50 maleic acid:acrylic acid copolymer
H—Itaconic acid:acrylic acid copolymer
I—64% hydrolysed polyacrylamide
L—Acrylic acid homopolymer mw 27,000
M—Acrylic acid homopolymer mw 3,500
N—Polyacrylamide homopolymer
O—15:85 acrylic acid:acrylamide These low molecular weight polymers all had molecular weights below about 10,000 except where other values are quoted. The proportions are by weight of the free acid. The polymers were all used as the sodium salts except for polymer L which was used as the ammonium salt.

Intermediate Molecular Weight Polymers
(Comparative)

J—Acrylic acid homopolymer mw 76,000
K—Acrylic acid homopolymer mw 250,000

High Molecular Weight Polymers mw above 500,000

S—Acrylic acid homopolymer mw 10,000,000
T—64:36 acrylic acid:acrylamide copolymer
X—64% hydrolysed polyacrylamide
Y—Methacrylic acid homopolymer
Z—2-acrylamido-2-methyl propane sulphonic acid homopolymer The proportions are by weight of the free acid groups. The polymers were used as the sodium salt.

The results are shown in the following Table in which the YP values and the 10 Second Gel values are recorded in lb. 100 ft$^{-2}$, the dosage is percent by weight on the clay, the PV and AV values are in cP and whether or not the extended clay complies with the API specification is indicated by Y (yes) or N (no). The polymer is indicated by the letters quoted above and where blends are used the proportions are by weight. Thus 2M:S indicates 2 parts by weight polymer M and one part by weight polymer S.

Australian bentonite was used in each of the tests except Tests 11-20 in which a bentonite from USA was used.

TABLE 1

| Test | Polymer | Dosage | PV | YP | AV | YP/PV | 10" gel | 30' fluid loss | API |
|------|---------|--------|-----|-----|------|-------|---------|----------------|-----|
|      |         | 0      | 3   | 34  | 20   | 11.3  | —       | 14.0           | N   |
| 1    | 2M:S    | 0.13   | 7   | 25  | 19.5 | 3.6   | —       | 13.4           | N   |
| 2    | 2M:S    | 0.27   | 9   | 25  | 21.5 | 2.8   | —       | 13.0           | Y   |
| 3    | 2M:S    | 0.4    | 9   | 19  | 18.5 | 2.1   | —       | 13.0           | Y   |
| 4    | S       | 0.09   | 8   | 31  | 23.5 | 3.9   | —       | 13.6           | N   |
| 5    | S       | 0.13   | 9.5 | 33.5| 26.25| 3.5   | —       | 14.0           | N   |
| 6    | S       | 0.22   | 14  | 47  | 37.5 | 3.4   | —       | 14.0           | N   |
| 7    | S       | 0.36   | 16  | 80  | 56   | 5.0   | —       | 14.1           | N   |
| 8    | M       | 0.18   | 6   | 22  | 17   | 3.7   | —       | 14.1           | N   |
| 9    | M       | 0.31   | 5   | 17  | 13.5 | 3.4   | —       | 13.8           | N   |
| 10   | M       | 0.44   | 5   | 12  | 11   | 2.4   | —       | 12.9           | N   |
| 11   | —       | —      | 4   | 22  | 15   | 5.5   | 37      | 18             | N   |
| 12   | S       | 0.25   | 10  | 49  | 34.5 | 4.9   | 44      | 18.5           | N   |
| 13   | S       | 0.5    | 11  | 77  | 49.5 | 7     | 36      | 22.5           | N   |
| 14   | S       | 0.75   | 14  | 70  | 49   | 5     | 30      | 27.5           | N   |
| 15   | M       | 0.25   | 5   | 9   | 9.5  | 1.8   | 3       | 15             | N   |
| 16   | M       | 0.5    | 6   | 1   | 7.5  | 0.17  | 2       | 14.5           | N   |
| 17   | M       | 0.75   | 5   | 2   | 6    | 0.4   | 1       | 15             | N   |
| 18   | 2M:S    | 0.5    | 9   | 21  | 19.5 | 2.33  | 13      | 14.5           | Y   |
| 19   | 2M:S    | 0.75   | 9   | 19  | 18.5 | 2.11  | 13      | 14.8           | Y   |
| 20   | 2A:S    | 0.31   | 14  | 32  | 30   | 2.29  | 30      | 14.0           | Y   |
| 21   | 5B:S    | 0.36   | 10  | 29  | 24.5 | 2.90  | 37      | 14.0           | Y   |
| 22   | 2C:S    | 0.22   | 10  | 24  | 22   | 2.40  | 23      | 14.0           | Y   |
| 23   | 2D:S    | 0.22   | 8   | 22  | 19   | 2.75  | 24      | 13.5           | Y   |
| 24   | 2E:S    | 0.22   | 9   | 17  | 17.5 | 1.89  | 10      | 14.0           | Y   |
| 25   | 2F:S    | 0.22   | 10  | 18  | 19   | 1.80  | 14      | 13.5           | Y   |
| 26   | 2G:S    | 0.44   | 20  | 44  | 42   | 2.2   | 53      | 14             | Y   |
| 27   | 2I:S    | 0.24   | 11  | 22  | 22   | 2.0   | 16      | 13.5           | Y   |
| 28   | 2M:S    | 0.22   | 8   | 19  | 17.5 | 2.30  | 17      | 13.3           | Y   |
| 29   | 2L:S    | 0.19   | 19  | 33  | 28.5 | 1.74  | 43      | 13.0           | Y   |
| 30   | 2J:S    | 0.23   | 9   | 112 | 65   | 12.4  | 56      | —              | N   |
| 31   | 2K:S    | 0.22   | 12  | 128 | 76   | 10.67 | 63      | —              | N   |
| 32   | 2M:Z    | 0.23   | 12  | 14  | 19   | 1.17  | 16      | 13             | Y   |
| 33   | 2M:X    | 0.23   | 11  | 23  | 22.5 | 2.09  | 17      | 13             | Y   |
| 34   | 2N:S    | 0.22   | 12  | 31  | 27.5 | 2.58  | 48      | 13.5           | Y   |
| 35   | 2O:S    | 0.22   | 13  | 26  | 26   | 2.0   | 43      | 13             | Y   |

Comparison of, for instance, Tests 4–7 and 8–10 with Tests 1–3 shows that the use of blends according to the invention (Tests 1–3) improves the overall properties and that if sufficient blend is used (Tests 2 and 3) the properties of the clay are brought within the API specification.

Comparison of, for instance, Tests 30, 31 and 32 shows that increasing the molecular weight of the polymer above 50,000 causes the PV:YP ratio to become too high.

I claim:

1. A composition comprising a blend of (a) a low molecular weight, water soluble non-ionic or anionic polymer having a molecular weight of about 1,000 to about 20,000 and formed from 0 to 100% acrylamide and 100 to 0% anionic monomer selected from the group consisting of acrylic acid, methacrylic acid, maleic acid, allyl sulfonate and 2-acrylamido-2-methyl propane sulphonic acid and (b) a high molecular weight, water soluble, polymer having molecular weight of at least about 1 million and formed from polymerisable monomers of which 0 to 70% by weight are acrylamide and 30 to 100% by weight are selected from acrylic acid, allyl sulphonate and 2-acrylamido-2-methyl propane sulphonic acid, said blend being substantially free of polymer of molecular weight 50,000 to 500,000, and wherein the weight ratio of low molecular weight polymer:high molecular weight polymer is about 10:1 to 1:5.

2. A composition according to claim 1 in which the high molecular weight polymer and the low molecular weight polymers are both polyacrylic acid.

3. A composition according to claim 1 in which the molecular weight of the high molecular weight polymer is about 1,000,000 to 15,000,000.

4. A composition according to claim 1 in which the weight ratio low molecular weight polymer:high molecular weight polymer is from about 5:1 to 1:1.

5. A composition according to claim 1 in which said anionic monomer is acrylic acid and in which said high molecular weight polymer is formed from polymerisable monomers of which 0 to 70% by weight are acrylamide and 30 to 100% by weight are acrylic acid.

6. A composition according to claim 1 containing bentonite and an effective extending amount of the blend.

7. An extended bentonite suitable for use in drilling muds and containing a bentonite that does not comply with API Specification 13A and an effective extending amount of a composition according to claim 1.

8. A composition according to claim 7 that complies with API Specification 13A.

9. A composition according to claim 1 in the form of an aqueous drilling mud containing the polymer blend and bentonite-type clay.

10. An aqueous drilling mud containing a bentonite that does not comply with API Specification 13A and an effective extending amount of a composition according to claim 1.

11. An aqueous drilling mud according to claim 10 in which the low and high molecular weight polymers are each polymers formed of 70 to 100% acrylic acid and 0 to 30% acrylamide.

12. A composition comprising a blend of low molecular weight, water soluble polymer formed of 70–100% acrylic acid and 0–30% acrylamide having a molecular weight about 1,000 to about 20,000 and a high molecular weight, water soluble, polymer formed of 70–100% acrylic acid and 0–30% acrylamide having a molecular weight of at least about 1 million, wherein the weight ratio low molecular weight polymer:high molecular weight polymer is about 10:1 to 1:5.

* * * * *